United States Patent
Gillan et al.

(10) Patent No.: US 7,228,699 B2
(45) Date of Patent: Jun. 12, 2007

(54) PLATE HEAT AND MASS EXCHANGER WITH EDGE EXTENSION

(75) Inventors: Leland E. Gillan, Denver, CO (US);
Valeriy Maisotsenko, Aurora, CO (US); Timothy L. Heaton, Arvada, CO (US); Alan D. Gillan, Denver, CO (US); Rick J. Gillan, Golden, CO (US)

(73) Assignee: Idalex Technologies, Inc., Arvada, CO (US)

( * ) Notice: Subject to any disclaimer, the term of this patent is extended or adjusted under 35 U.S.C. 154(b) by 201 days.

(21) Appl. No.: 11/061,124

(22) Filed: Feb. 18, 2005

(65) Prior Publication Data
US 2005/0217303 A1    Oct. 6, 2005

Related U.S. Application Data

(60) Provisional application No. 60/545,672, filed on Feb. 18, 2004.

(51) Int. Cl.
*F28D 5/00*    (2006.01)
(52) U.S. Cl. .......................................... 62/314; 62/304
(58) Field of Classification Search .................... 62/91, 62/121, 171, 304, 310, 314, 315; 165/164–166; 261/153
See application file for complete search history.

(56) References Cited

U.S. PATENT DOCUMENTS

| | | | | |
|---|---|---|---|---|
| 4,002,040 A | * | 1/1977 | Munters et al. | 62/121 |
| 5,187,946 A | * | 2/1993 | Rotenberg et al. | 62/314 |
| 5,349,829 A | * | 9/1994 | Tsimerman | 62/314 |
| 5,453,223 A | * | 9/1995 | Maisotsenko | 261/153 |
| 5,644,433 A | * | 7/1997 | Ikari | 359/687 |
| 5,800,595 A | * | 9/1998 | Wright | 95/288 |
| 5,860,284 A | * | 1/1999 | Goland et al. | 62/94 |
| 6,282,915 B1 | * | 9/2001 | Egbert | 62/314 |

* cited by examiner

*Primary Examiner*—Melvin Jones
(74) *Attorney, Agent, or Firm*—Macheledt Bales & Heidmiller, LLP; Jennifer L. Bales

(57) ABSTRACT

Heat exchanger plates for indirect evaporative coolers, of the type having a dry side having low permeability to an evaporative liquid and formed to allow a product fluid to flow over a heat transfer area of its surface, a wet side designed to have its surface wet by an evaporative liquid, and formed to allow a working gas to flow over its surface to evaporate the evaporative liquid, further include edge extensions formed beyond the heat exchange area of the plates to facilitate removal of excess evaporative liquid. The edge extensions may slant or curve away from the wet side of the plates to assist in liquid removal. The plates may be used in a variety of configurations.

17 Claims, 5 Drawing Sheets

PLATE HEAT AND MASS EXCHANGER WITH EDGE EXTENSION

U.S. Pat. No. 6,581,402, issued Jun. 24, 2003 is incorporated herein by reference. U.S. Pat. No. 6,705,096, issued Mar. 16, 2004 is incorporated herein by reference. This application claims the benefit of U.S. Provisional Patent Application No. 60/545,672, filed Feb. 18, 2004.

BACKGROUND OF THE INVENTION

1. Field of the Invention

The present invention relates to plate heat and mass exchangers for indirect evaporative coolers. In particular, the present invention relates to such plates having edge extensions for enhanced fluid removal.

2. Discussion of the Background Art

Indirect evaporative cooling is a method of cooling a fluid stream; usually air, by evaporating a cooling liquid, usually water, into a second air stream while transferring heat from the first air stream to the second. The method has certain inherent advantages compared to conventional air conditioning: low electricity requirements, relatively high reliability, and the ability to do away with the need for refrigerants such as R-134 and all the disadvantages they entail.

U.S. Pat. No. 6,581,402 shows a number of embodiments for indirect evaporative cooling using plate apparatus. FIG. 1 (Prior art) shows a perspective and schematic representation of two plates showing the wet side channels formed by the wet sides of a first and a second plate opposing each other, with their passages oriented in the same general area and illustrating the working gas entering on the dry side, passing through the passages and into the wet side channels. The product fluid is separated from the working gas as they pass along the dry side of the first and second plates. Additional plates form a stack, and adjacent plates have their dry sides facing each other. Thus, the stack of plates would have every odd plate oriented with its dry side facing the same direction and opposite of all even plates.

The invention of U.S. Pat. No. 6,581,402 provides an indirect evaporative cooler having cross flowing wet and dry channels on opposite sides of a plurality of heat exchange plates which allow heat transfer through the plates. The plates include edge extensions to facilitate the removal of water (or similar evaporative fluid) and dissolved minerals from the plates.

For purposes of both U.S. Pat. No. 6,581,402 and the present application, we wish to define certain terms:

1. Heat transfer surface or heat exchange surface has many configurations. All are encompassed within the subject of this disclosed invention with appropriate adjustment to the wetting and flows as are well known in the industry. For illustration we make use of a plate configuration.
2. Wet side or wet portion of the heat exchange surface means that portion having evaporative liquid on or in its surface, thus enabling evaporative cooling of the surface and the absorption of latent heat from the surface.
3. Dry side or dry portion of the heat exchanger means that portion of the heat exchanger surface where there is little or no evaporation into the adjacent gas or fluid. Thus, there is no transfer of vapor and latent heat into adjacent gases. In fact, the surface may be wet but not with evaporative fluid or wet by condensation, but no evaporation exists.
4. Working stream or working gas stream is the gas flow that flows along the heat exchange surface on the dry side, passes through the passages in the surface to the wet side and picks up vapor and by evaporation, taking latent heat from the heat exchange surface and transporting it out into the exhaust. In some embodiments, the working stream may be disposed of as waste and in others it may be used for special purposes, such as adding humidity or scavenging heat.
5. Product stream or product fluid stream is the fluid (gas, liquid or mixture) flow that passes along the heat exchange surface on the dry side and is cooled by the absorption of heat by the working gas stream on the wet side absorbing latent heat by the evaporation in the wet area.

The plate also has passageways or perforations or similar transfer means between the dry side of the plate and the wet side in defined areas providing flow from the dry working channels to the working wet channels in which direct evaporative cooling takes place.

The method of the invention makes use of the separation of a working gas flow (that is used to evaporate liquid in the wet channels and thus to cool the wet surface of the heat exchanger plate) from the product fluid flow, flowing through dry product channels and dry working channels respectively on the same side of the heat exchange plate. Both give up heat to the heat exchange plate that on its obverse surface is being cooled by evaporation in the working wet channels.

The working gas flow first enters the dry working channel and then through perforations, pores or other suitable means of transfer across the barrier of the plate to the wet side and thence into the wet working channels where evaporation of liquid on the wet channel surface, cools this plate.

The dry product channels are on the dry side of this plate. The plate is of a thin material to allow easy heat transfer across the plate and thus to readily allow heat to transfer from the dry product channel to the wet working channel. This is one basic unit or element of the invention illustrating the method of the separation of working gas flows to indirectly cool the separate product fluid by evaporative cooling.

Many evaporative cooling embodiments include a wicking material for distributing the water or other evaporative liquid over the plate wet side. See, for example, FIG. 7 of U.S. Pat. No. 6,581,402, wherein a wicking material 7 distributes the evaporative liquid along wet side channels 5. Plates 6 form a "V-shape" in the embodiment of FIG. 7. Water also evaporates better from a wicking surface that from a water surface, as the wick material breaks down the surface tension of the water.

Wicking up a vertical surface will insure no excess water on the plate surface but also limits the height of the plate that can be used. Wicking water down a surface aided by gravity may be good from a wetting perspective if the amount of water does not exceed what the wick can transport. Wicking in a more horizontal direction can allow a vertical reservoir wetting system such as shown in U.S. Pat. No. 6,705,096. There are some plate heat and mass exchanger applications that require a more innovative geometry that corresponds to a more complicated thermodynamic design that again require a more horizontal application such as U.S. Pat. No. 6,581,402. In all cases creating a means to insure that the wick will not be over run by water is desired.

The indirect evaporative cooler of U.S. Pat. No. 6,581,402 works well. But a disadvantage inherent in the design has been found in use. Sloping the plates to allow gravity to help pull water through the wick helped to remove excess liquid and washing minerals off the plates. However, the closely spaced heat exchanger plates, with wicking surfaces facing each other, allowed water to build up in the channels. This buildup was caused by the surface tension of the water adhering the edge of the plates. For example, given two horizontal plates in parallel, a drip from the top plate would hang down and adhere to a drip on the lower at the plate edges. Water would then back up from the edges of the plates on the wick surfaces giving two detrimental effects. First the surface water significantly reduced the heat transfer rate and thus the cooling of the fluid on the opposite side of the plate. Second, this over wetting between the plates caused an uneven airflow distribution across the wet plates and therefore uneven cooling of the fluid to be cooled on the opposite side of the plates.

As water in the wet channels is evaporated any dissolved minerals that were in the water are left behind. Even if not all of the water is evaporated away, when the minerals in the water become too concentrated they deposit on any surface they come into contact with. Such deposited minerals present a long-term problem, as they build up and eventually impede the flow of water, particularly in the wick material. Portions of the plate are no longer thoroughly wetted, and heat exchange efficiency drops.

Therefore, a need remains in the art for apparatus and methods for drawing excess liquid and minerals away from the heat exchanging portion of the plate, and removing them from the plate.

SUMMARY OF THE INVENTION

It is an object of the present invention to provide apparatus and methods for drawing excess liquid and minerals away from the heat exchanging portion of the plate, and removing them from the plate.

Edge extensions are added to the plates of indirect evaporative coolers to allow excess evaporative liquid to migrate to the edges of the plates and drip off, taking dissolved minerals with it. Better evaporation and heat transfer can also be accomplished.

BRIEF DESCRIPTION OF THE DRAWINGS

FIG. 2b is a side view of embodiment of FIG. 2a.

DETAILED DESCRIPTION OF THE INVENTION

FIGS. 2a–6 show various embodiments of edge extensions added to heat transfer plates in indirect evaporative coolers. While several embodiments are shown, it will be apparent to those skilled in the art that the edge extensions can be added to many other indirect evaporative cooler plates. U.S. Pat. Nos. 6,581,402 and 6,705,096, incorporated herein by reference, show a variety of plate configurations, and others are known as well. In each case, the edge extensions are added to the edges of the plates, beyond the heat exchange portion of the plates, and facilitate removal of excess evaporative liquid from the wet sides of the plates. While the term "beyond the heat exchange of the plates" is used to indicate that the edge extensions are added to the sides or ends of the plates, this does not imply that no heat exchange can occur there. The following table lists reference numbers used in this patent:

| | |
|---|---|
| 1 | dry side product fluid (e.g. air) |
| 2 | working gas (e.g. air) |
| 3 | dry side product channels (perforation embodiments) |
| 4 | dry side working channels |
| 5 | wet side channels |
| 6 | plates |
| 7 | channel guides |
| 8 | wick material |
| 9 | dry sides of plates |
| 10 | wet sides of plates |
| 11 | perforations |
| 20 | edge extensions |
| 21 | length of edge extensions |
| 22 | evaporative fluid (e.g. water) |
| 23 | trough for wetting plates |
| 24 | Non-permeable layer |
| 25 | Wicking layer |

Figure 1:
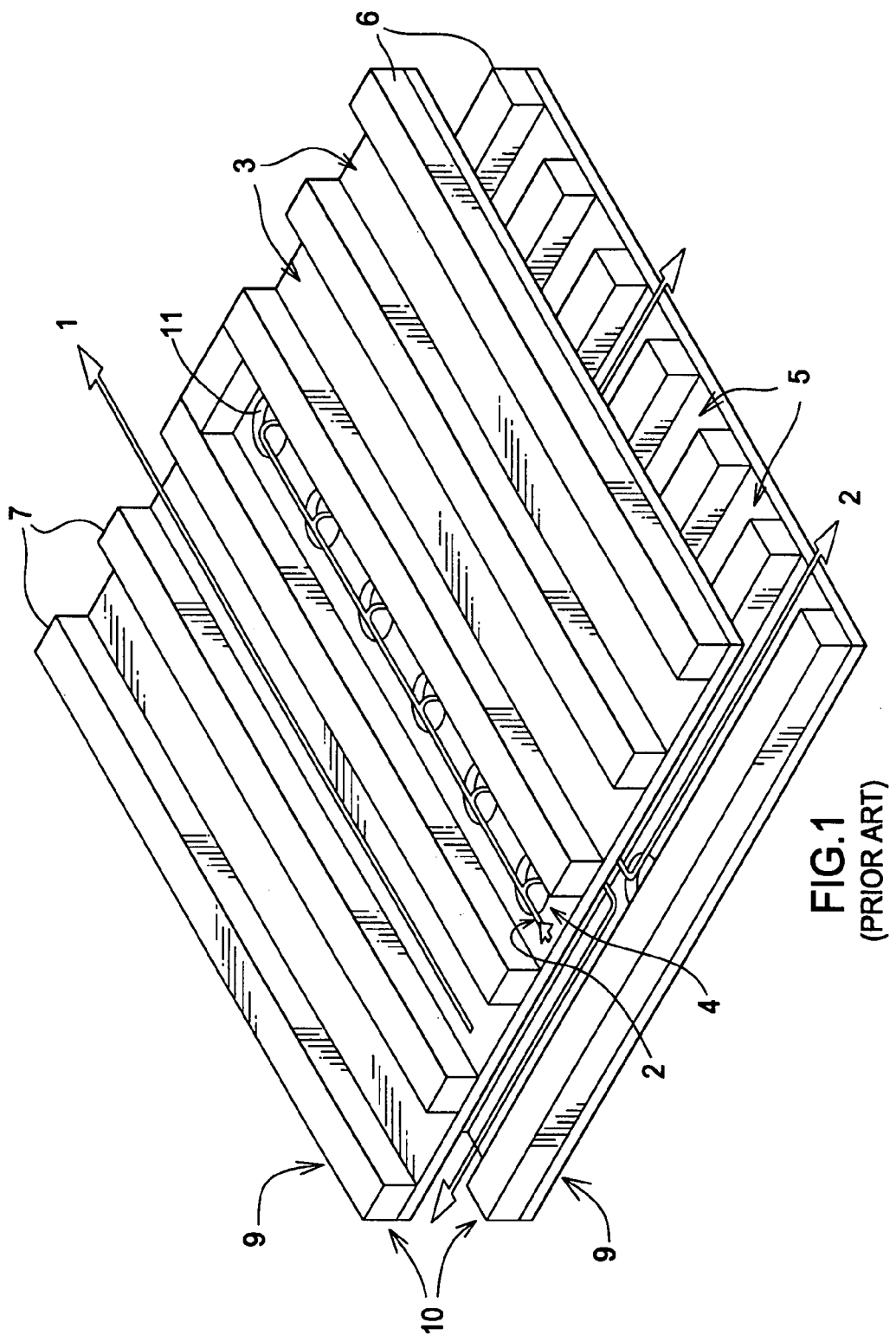
FIG. 1 (Prior Art) is a perspective and schematic drawing showing two heat transfer plates.
Figure 2A:
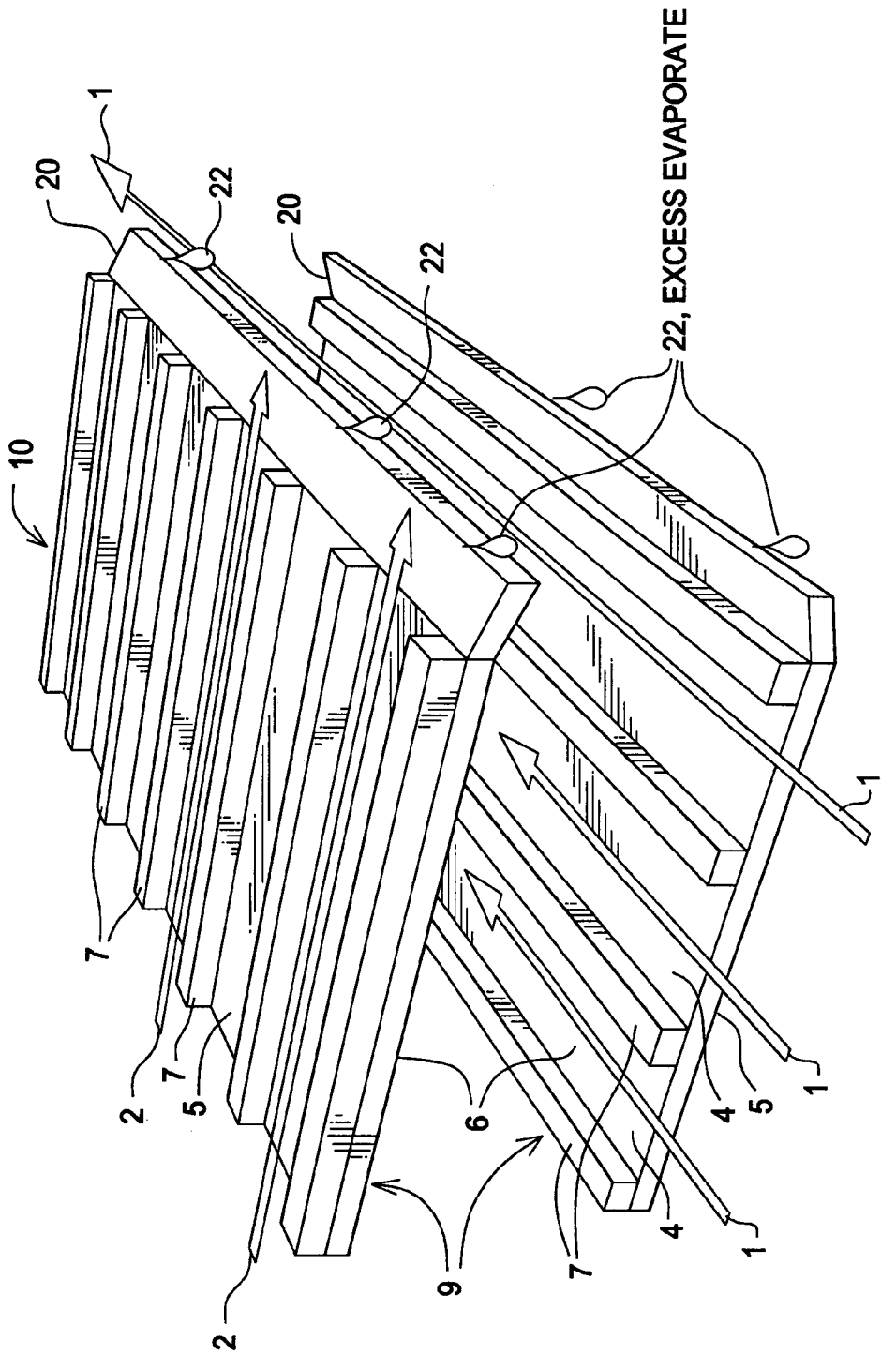
FIG. 2a is a perspective and schematic representation of a first embodiment of the present invention, having slanted edge extensions.
Figure 2B:
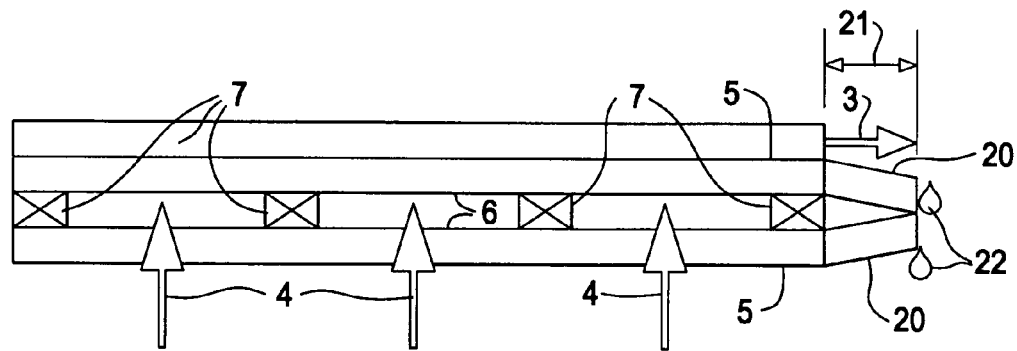

FIG. 2a is a perspective and schematic representation of a first embodiment of the present invention, having slanted edge extensions 20. FIG. 2b is a side view of embodiment of FIG. 2a. The plates 6 in FIGS. 1a and 1b are shown as horizontal, but they may also be tilted (see for example FIG. 7 of U.S. Pat. No. 6,581,402).

The embodiment of FIGS. 1a and 1b is a transverse-flow design somewhat similar to that of FIG. 1 (Prior Art). Each plate has a dry side 9, and the dry sides face each other. Dry sides 9 include dry side channels 4, through which product fluid 1 flows. Wet sides 10 have wet side channels 5 through which working gas 2 flows. The wet side channels 5 are generally transverse to the dry side channels 4.

Wet side channels 5 are wetted by an evaporative liquid 22, via wicking, spraying or a similar method. The specific embodiment shown in FIGS. 2a and 2b does not show working channels for passing a working fluid through the plates from the dry side to the wet sides, as is shown in FIG. 1(Prior Art), but those could be included in the FIG. 2 embodiment. FIG. 2b shows the excess evaporative fluid 22 flowing out of wet side channel 5 and dripping off edge extensions 20 of plates 6. The slanted edge extensions, which extend a distance 21 off the end of plates 6, facilitate this fluid removal by opening up the space beyond the heat transfer portion of wet sides 10.

In a particular preferred embodiment of an indirect evaporative cooling system (described here by way of an example), 80 plates are stacked in a 10 inch high stack. The dimensions of the plates are 20 inches by 18 inches. The plate material is polyethelene coating on cellulose fiber paper (the paper acts as a wicking material). The spacing between the plates is 0.125 inches.

In practice, edge extension lengths 21 of ½ inch and 1 inch work very well in causing excess evaporative liquid 22 to drain. With plate spacing of around 0.125 inches, edge extensions of substantially under ¼ inch do not work as well (¹⁄₁₆ inch does not work at all with this plate spacing). However, with tighter plate spacings, edge extensions of a small as ⅛ inch are expected to accomplish the goal of efficiently removing excess evaporative liquid. Edge extensions substantially longer than plate spacing work best.

Figure 3:
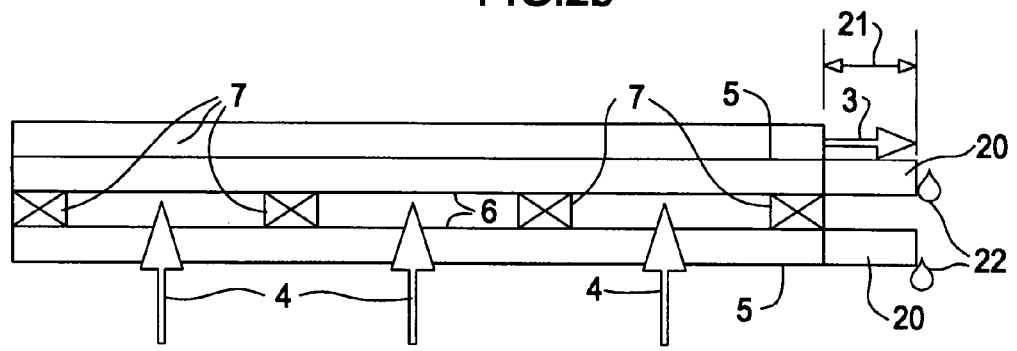
FIG. 3 is a side view of a second embodiment of the present invention, having straight edge extensions.

FIG. 3 is a side view of a second embodiment of the present invention, very similar to that of FIGS. 2a and 2b, but having straight edge extensions. Much of the discussion related to FIGS. 2a and 2b is relevant to this embodiment as well.

Edge extension 20 in the embodiment of FIG. 3 extend straight out, rather than curving away from wet sides 10. This design is easier to fabricate than the design of FIGS. 2a and 2b, and does remove excess evaporative fluid better than conventional plates without edge extensions.

Figure 4:
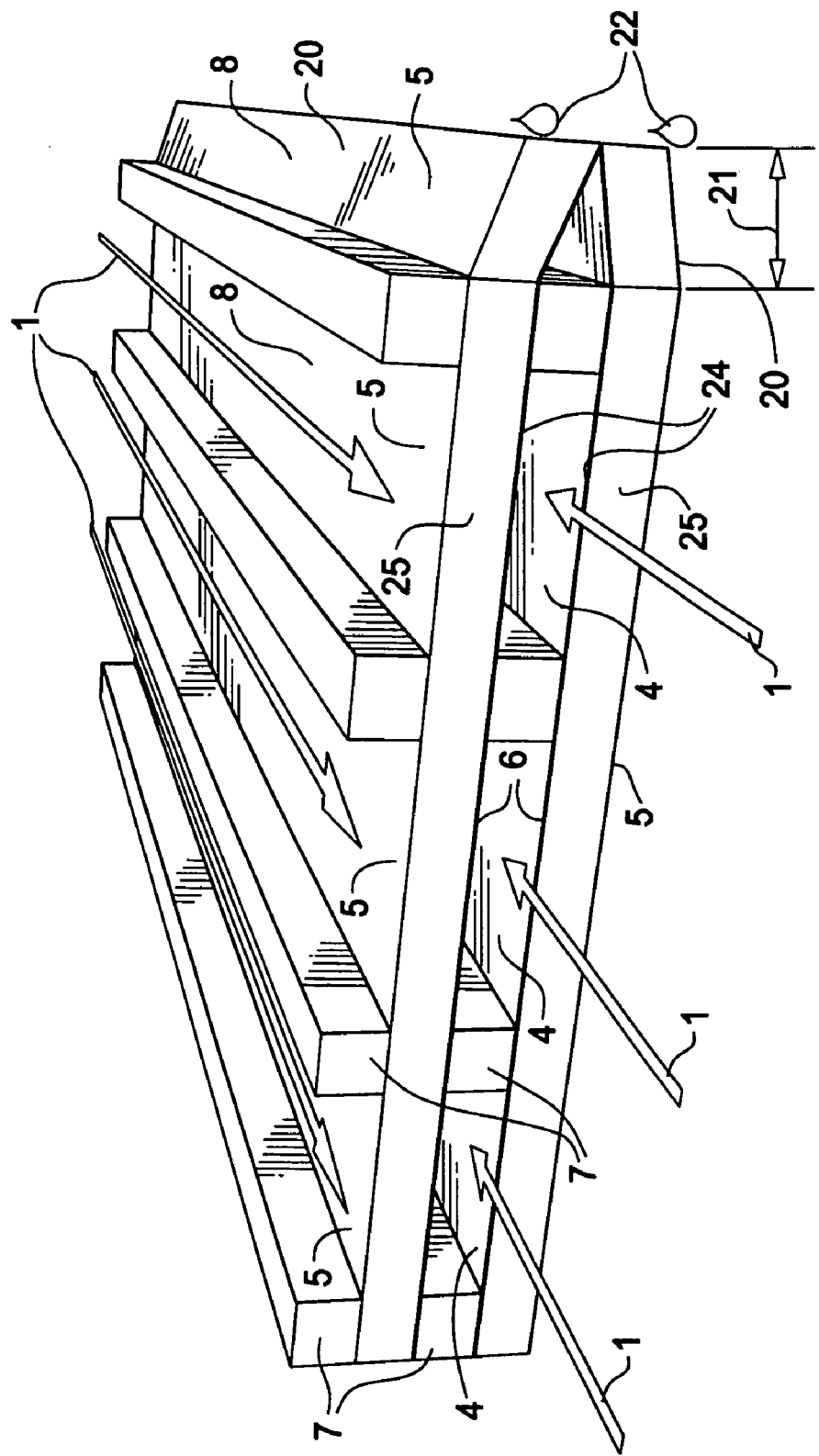
FIG. 4 is a perspective and schematic representation of a third embodiment of the present invention, utilizing a counter flow design and having slanted edge extensions.

FIG. 4 is a perspective and schematic representation of a third embodiment of the present invention, utilizing a counter-flow design and having slanted edge extensions 20. Rather than having wet side channels 5 and dry side channels 4 transverse to each other, they are generally parallel, but flow in opposite directions. The edge extension is generally transverse to the wet side channel guides so that the working gas flows in a direction other than toward the edge extension (perpendicular in the embodiment of FIG. 4). Evaporative liquid 22 still coats wet side channels 5 through wick material 8, and migrates via wicking under channel guides 7, so that excess liquid travels to edge extensions 20 and drips off.

Migration of evaporative liquid 22 under channel guides 8 is accomplished as follows. Plates 6 are formed of a wicking material 25 backed by a material 24 that is impermeable to the evaporative liquid 22. For example, plates 6 might be formed of polyethelene coating 24 on cellulose fiber paper 25. Paper 25 acts as a wicking material, wicking liquid 22 under channel guides 7 and out to edge extensions 22, where liquid 22 drips off of the plates.

Figure 5:
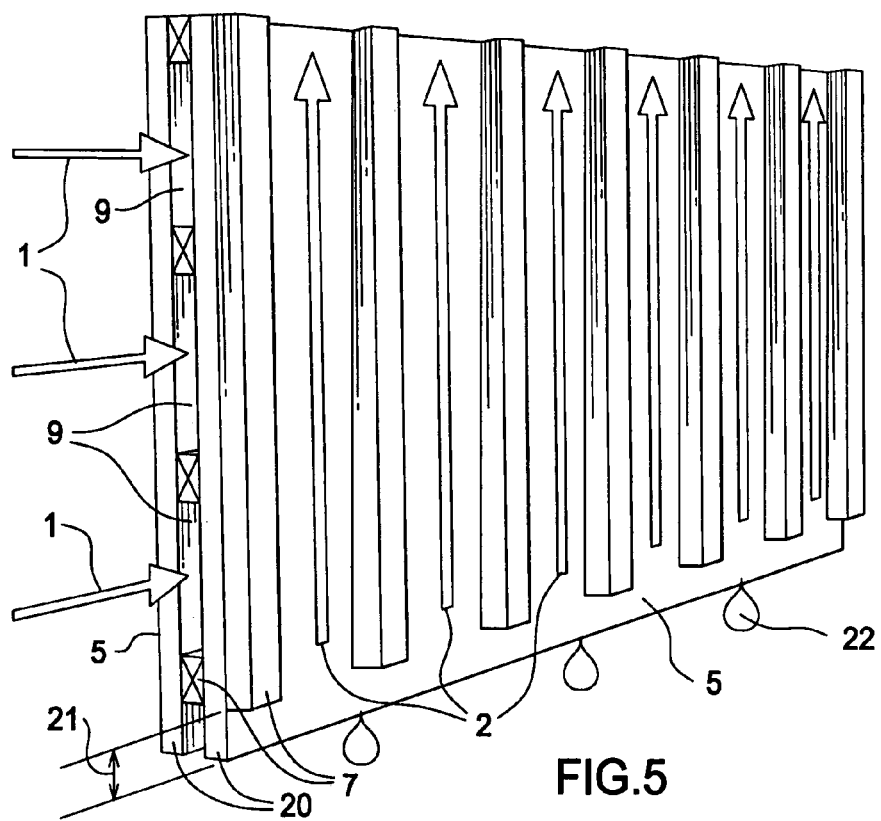
FIG. 5 is a perspective and schematic representation of a fourth embodiment of the present invention, with the plates in a vertical orientation having straight edge extensions.

FIG. 5 is a perspective and schematic representation of a fourth embodiment of the present invention, with the plates 6 in a vertical orientation, and having straight edge extensions 20 Working gas flow 2 is upward in wet side channels 5 and product fluid flow 1 is sideways along dry side channels 4. Evaporative liquid flows down channels 5 from the top and drips off edge extensions 20 at the bottom.

Figure 6:
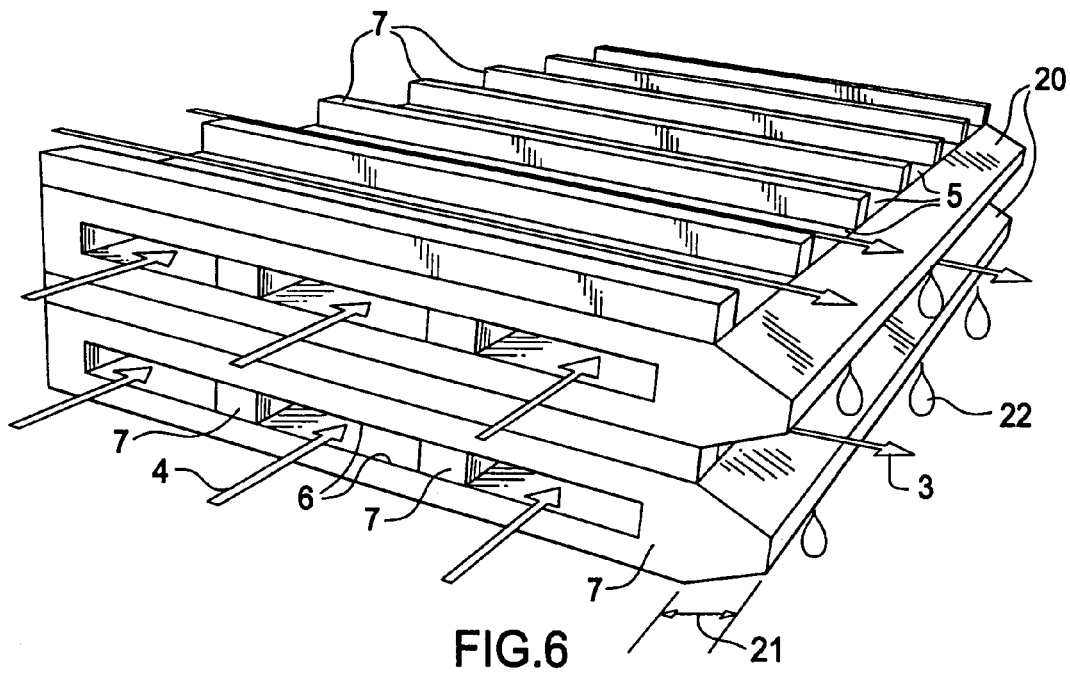
FIG. 6 is a perspective and schematic representation of a fifth embodiment of the present invention, with an integral design and having slanted edge extensions.

FIG. 6 is a perspective and schematic representation of a fifth embodiment of the present invention, with an integral design and having an integral form of slanted edge extensions 20. The embodiment of FIG. 6 is preferably formed of a solid block of a single material, such as extruded aluminum. This design is advantageous when the plates will be under some stress, such as when the indirect evaporative cooler is pressurized.

In some applications of the invention the plates 6 and spacers 7 may be formed out of rigid materials such as aluminum. In such cases the plates 6 and plate spacers 7 may be extruded in one piece such as shown in FIG. 6. The edge extensions 20 of plates 6 are preferably tapered to have a larger opening at the edges, to facilitate excess liquid 22 dripping off. The evaporative (wet) side of the plates 10 requires structure to have the evaporate 22 distribute over its surface. Distributing the evaporate can be accomplished with either flocking material or by etching the surface of a material such as aluminum creating a wick surface.

Hydrophilic surfaces, such as described in U.S. Pat. No. 6,568,465 to Meissner et al can act as wicking surfaces.

Figure 7:
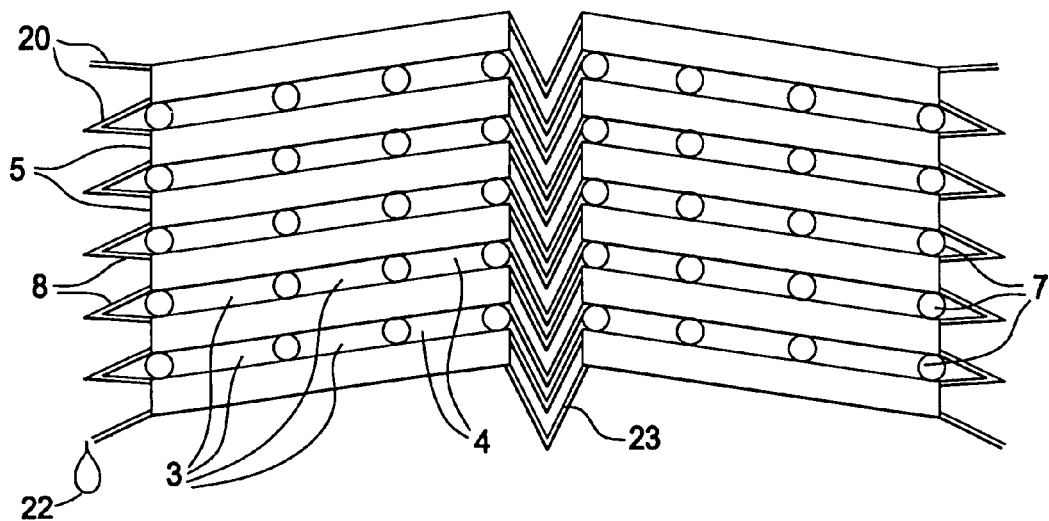
FIG. 7 is a end cut-away view of a sixth embodiment of the present invention, in which the plates slant downward from a center axis and having a trough system for wetting the plates.

FIG. 7 is an end cut-away view of a sixth embodiment of the present invention, in which plates 6 slant downward from a center axis. A trough 23 contains evaporative liquid 22 for wetting the plates. Generally a wicking material 25 (see FIG. 4 for an example) draws liquid 22 from trough 23 along wet side channels 5. As liquid 22 reaches the outer ends of plates 6, it is drawn off the plates by edge extensions 20, here shown as slanted edge extensions similar to those shown in FIGS. 2a and 2b.

Those skilled in the art of indirect evaporative cooling systems will recognize various changes and modifications which can be made to the exemplary embodiments shown and described above, which are still within the spirit and scope of the invention. In all cases, edge extensions on the heat exchanger plates extend past the heat transfer area of the plates and assist the evaporative fluid in draingin off the plates.

What is claimed is:

1. A heat exchanger plate for use in an indirect evaporative cooling system, the plate comprising:
    a dry side having low permeability to an evaporative liquid and formed to allow a product fluid to flow over a heat transfer area of its surface;
    a wet side designed to have its surface wet by an evaporative liquid, and formed to allow a working gas to flow over its surface to evaporate the evaporative liquid; and
    an edge extension formed at the edge of the plate, beyond the heat transfer area, for causing excess evaporative liquid to drip off the plate.

2. The plate of claim 1, wherein the edge extension slopes away from the wet side.

3. The plate of claim 1 formed as an integral piece of a single material.

4. The plate of claim 3 wherein the material is aluminum.

5. The plate of claim 4, wherein the wet side is textured to form a wicking surface.

6. The plate of claim 3, further comprising a wicking material attached to the wet side of the plate.

7. The plate of claim 1, wherein the wet side includes a wicking surface.

8. The plate of claim 1, wherein the wet side includes channel guides to channel the working gas.

9. The plate of claim 8, wherein the working gas flows in a direction other than toward the edge extension, and wherein the evaporative liquid flows under the channel guides to reach the edge extension.

10. An indirect evaporative cooler comprising:
    a plurality of generally parallel, spaced apart plates wherein each plate has
    a dry side having low permeability to an evaporative liquid and formed to allow a product fluid to flow over a heat transfer area of its surface;
    a wet side designed to have its surface wet by an evaporative liquid, and formed to allow a working gas to flow over its surface to evaporate the evaporative liquid; and
    an edge extension formed at the edge of the plate, beyond the heat transfer area, for causing excess evaporative liquid to drip off the plate;
    wherein the edge extensions extend beyond the edge of the heat transfer areas of the plates for a distance at least the distance between the plates.

11. The indirect evaporative cooler of claim 10 wherein the plates are oriented generally vertically and the edge extensions are located at the bottoms of the plates.

12. The indirect evaporative cooler of claim 10 wherein the plates are oriented generally horizontally.

13. The indirect evaporative cooler of claim 10 wherein the plates are slanted downward in each direction from a center axis.

14. The indirect evaporative cooler of claim 13, further comprising a trough located at the center axis, the trough containing the evaporative fluid.

15. The indirect evaporative cooler of claim 14, wherein the plates include a wicking material on their wet sides.

16. The indirect evaporative cooler of claim 10, wherein the working gas flows in a direction other than toward the edge extensions, and wherein the evaporative liquid flows under the channel guides to reach the edge extensions.

17. The indirect evaporative cooler of claim 10, wherein the plates include a wicking material on their wet sides.

* * * * *

UNITED STATES PATENT AND TRADEMARK OFFICE
CERTIFICATE OF CORRECTION

PATENT NO.         : 7,228,699 B2
APPLICATION NO. : 11/061124
DATED              : June 12, 2007
INVENTOR(S)        : Gillan et al.

It is certified that error appears in the above-identified patent and that said Letters Patent is hereby corrected as shown below:

Column 2, line 46, delete "that" and insert --than--.

Column 2, line 60, delete "insure" and insert --ensure--.

Column 5, line 12, delete "extend" and insert --extends--.

Column 5, line 41, after "extensions 20" insert --.--.

Column 6, line 41, delete "draigin" and insert --draining--.

Signed and Sealed this

Eighteenth Day of September, 2007

JON W. DUDAS
*Director of the United States Patent and Trademark Office*